United States Patent
Kim et al.

(10) Patent No.: US 10,638,511 B2
(45) Date of Patent: Apr. 28, 2020

(54) METHOD FOR IMPROVING SPACE REUSE RATE IN WIRELESS LAN SYSTEM AND APPARATUS FOR SAME

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/139,743

(22) Filed: Sep. 24, 2018

(65) Prior Publication Data

US 2019/0029038 A1    Jan. 24, 2019

Related U.S. Application Data

(63) Continuation of application No. 15/303,194, filed as application No. PCT/KR2015/004417 on Apr. 30, 2015, now Pat. No. 10,117,270.

(Continued)

(51) Int. Cl.
*H04W 74/08* (2009.01)
*H04W 84/12* (2009.01)
(Continued)

(52) U.S. Cl.
CPC .......... *H04W 74/08* (2013.01); *H04B 17/318* (2015.01); *H04W 24/02* (2013.01); *H04W 84/12* (2013.01); *H04L 69/323* (2013.01)

(58) Field of Classification Search
CPC ..... H04W 74/08; H04W 24/02; H04W 84/12; H04B 17/318
See application file for complete search history.

(56) References Cited

U.S. PATENT DOCUMENTS 9,100,154 B1* 8/2015 Jeffery ............... H04L 5/005
2007/0060155 A1 3/2007 Kahana et al.
(Continued)

FOREIGN PATENT DOCUMENTS

CN    101253784    8/2008
JP    2004525586    8/2004
(Continued)

OTHER PUBLICATIONS

Porat, R. et al., "Improved Spatial Reuse Feasibility—Part I," doc.: IEEE 802.11-14/0082r0, Jan. 2014, 19 pages.
(Continued)

*Primary Examiner* — Min Jung
(74) *Attorney, Agent, or Firm* — Lee Hong Degerman Kang Waimey

(57) ABSTRACT

The present document relates to a method for determining whether a corresponding medium (for example, a channel) is reusable so as to improve a space reuse rate in a wireless communication system, particularly, a wireless LAN system, and an apparatus for the same. To this end, a station receives a wireless LAN signal through a specific wireless medium, compares the received signal intensity of the wireless LAN signal with a CCA level selected from between a first CCA level and a second CCA level lower than the first CCA level according to the type of the received wireless LAN signal, determines that the corresponding wireless medium is usable if the received signal intensity is lower than the selected CCA level, and can use the wireless medium in a signal transmission.

10 Claims, 9 Drawing Sheets

Related U.S. Application Data

(60) Provisional application No. 61/987,435, filed on May 1, 2014.

(51) Int. Cl.
   *H04B 17/318* (2015.01)
   *H04W 24/02* (2009.01)
   *H04L 29/08* (2006.01)

(56) References Cited

U.S. PATENT DOCUMENTS

| | | | |
|---|---|---|---|
| 2007/0286122 | A1 | 12/2007 | Fonseca |
| 2010/0232365 | A1 | 9/2010 | Lu et al. |
| 2012/0250532 | A1 | 10/2012 | Husted et al. |
| 2013/0017794 | A1 | 1/2013 | Kloper et al. |
| 2013/0188506 | A1 | 7/2013 | Cheong et al. |
| 2014/0328270 | A1* | 11/2014 | Zhu .................... H04W 74/002 370/329 |
| 2015/0071270 | A1* | 3/2015 | Harel ................ H04W 72/0413 370/338 |
| 2016/0081010 | A1 | 3/2016 | Seok |
| 2016/0128099 | A1 | 5/2016 | Liu et al. |
| 2016/0174079 | A1 | 6/2016 | Wang et al. |
| 2016/0174262 | A1* | 6/2016 | Xing .................... H04W 74/08 370/329 |
| 2016/0353480 | A1 | 12/2016 | Choi et al. |
| 2017/0041952 | A1 | 2/2017 | Kim et al. |
| 2019/0230533 | A1* | 7/2019 | Huang .................... H04L 43/16 |

FOREIGN PATENT DOCUMENTS

| | | |
|---|---|---|
| JP | 2008252867 | 10/2008 |
| JP | 2012028944 | 2/2012 |
| JP | 2012160895 | 8/2012 |
| RU | 2007127887 | 1/2009 |
| WO | 2014042434 | 3/2014 |

OTHER PUBLICATIONS

Russian Federation Federal Service for Intellectual Property, Patents and Trademarks Application No. 2016145080/08, Notice of Allowance dated Oct. 19, 2017, 15 pages.
European Patent Office Application Serial No. 15786176.6, Search Report dated Nov. 29, 2017, 11 pages.
Porat, R. et al., "Improved Spatial Reuse Feasibility", doc.: IEEE 802.11-14/0082r0, XP055426728, Jan. 2014, 20 pages.
Jiang, J. et al., "System Level Simulations on Increased Spatial Reuse", doc.: IEEE 802.11-14/0372r2, XP068069041, Mar. 2014, 10 pages.
U.S. Appl. No. 15/303,194, Notice of Allowance dated Jun. 20, 2018, 12 pages.
U.S. Appl. No. 15/303,194, Office Action dated Jan. 16, 2018, 14 pages.
PCT International Application No. PCT/KR2015/004417, Written Opinion of the International Searching Authority dated Aug. 18, 2015, 16 pages.
State Intellectual Property Office of the People's Republic of China Application Serial No. 201580021872.9, Office Action dated Feb. 2, 2019, 13 pages.

* cited by examiner

METHOD FOR IMPROVING SPACE REUSE RATE IN WIRELESS LAN SYSTEM AND APPARATUS FOR SAME

CROSS-REFERENCE TO RELATED APPLICATIONS

This application is a continuation of U.S. patent application Ser. No. 15/303,194, filed on Oct. 10, 2016, now U.S. Pat. No. 10,117,270, which is the National Stage filing under 35 U.S.C. 371 of International Application No. PCT/KR2015/004417, filed on Apr. 30, 2015, which claims the benefit of U.S. Provisional Application No. 61/987,435, filed on May 1, 2014, the contents of which are all hereby incorporated by reference herein in their entirety.

TECHNICAL FIELD

The present invention relates to a wireless communication system, and more particularly, to a method and apparatus for determining whether a corresponding medium (e.g., a channel) is available in order to increase a spatial reuse rate in a Wireless Local Area Network (WLAN) system.

BACKGROUND ART

While a proposed signal transmission method as set forth below is applicable to various types of wireless communication, the signal transmission method will be described below in the context of a WLAN system as an example of a system to which the present invention is applicable.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

DISCLOSURE

Technical Problem

An object of the present invention is to provide a method and apparatus for efficiently determining whether a corresponding medium (e.g., a channel) is available and transmitting a signal based on the determination in order to increase a spatial reuse rate and thus improve system performance in a Wireless Local Area Network (WLAN) system.

Technical Solution

In one aspect of the present invention, a method for transmitting a signal based on determination of a use state of a wireless medium by a station (STA) in a wireless local area network (WLAN) system includes receiving a WLAN signal through a specific wireless medium, comparing a received signal strength of the WLAN signal with a clear channel assessment (CCA) level selected between a first CCA level and a second CCA level according to a type of the WLAN signal, the second CCA level being lower than the first CCA level, if the received signal strength of the WLAN signal is less than the selected CCA level, determining the specific wireless medium to be available, and transmitting a signal of the STA according to the determination.

The first CCA level may be a CCA level for a high efficiency WLAN (HEW) WLAN signal, and the second CCA level is a CCA level for a legacy WLAN signal before the HEW WLAN signal.

If the received WLAN signal is one of a request to send (RTS) frame and a clear to send (CTS) frame in a legacy WLAN signal format, it may be determined whether the specific wireless medium is available by comparing a signal strength of the one of the RTS frame and the CTS frame with the second CCA level.

If the received WLAN signal is the RTS frame and the signal strength of the RTS frame is equal to or greater than the second CCA level, network allocation vector (NAV) information of the STA may be updated based on duration information about the RTS frame, and if the STA does not receive a physical layer protocol data unit (PPDU) within a predetermined time period without reception of the CTS frame after the reception of the RTS frame, the NAV information may be reset and the specific wireless medium may be determined to be available.

The method may further include, if a PPDU is detected within the predetermined time period without reception of the CTS frame after the reception of the RTS frame, determining whether the PPDU is from a basic service set (BSS) of the STA. If it is determined that the PPDU is not from the BSS of the STA and a received signal strength of the PPDU is equal to or less than the first CCA level, the specific wireless medium may be determined to be available.

If the CTS frame is received after the reception of the RTS frame, the NAV information may be updated based on information of the CTS frame. Meanwhile, if the CTS frame is received after the reception of the RTS frame, the method may further include comparing the received signal strength of the CTS frame with the first CCA level, and if the received signal strength of the CTS frame is less than the first CCA level, it may be determined whether the specific wireless medium is available, in further consideration of at least one of whether a subsequent PPDU is a HEW PPDU, whether a received signal strength of the subsequent PPDU is greater than the first CCA level, and whether the subsequent PPDU is from the BSS of the STA.

If the subsequent PPDU is not a HEW PPDU, is not from the BSS of the STA, and has a received signal strength less than the first CCA level, the specific wireless medium may be determined to be available.

When the received WLAN signal is an RTS frame and a PPDU is received within a predetermined time, (A) if a physical layer (PHY) header of the PPDU indicates that the PPDU is for the STA, or (B) if the PHY header of the PPDU indicates that the PPDU is not for the STA but the PPDU has a received signal strength equal to or greater than the first CCA level, a predetermined primitive may be issued and a set NAV may be maintained.

If the PHY header of the PPDU indicates that the PPDU is not for the STA and the PPDU has a received signal strength less than the first CCA level, the NAV may be reset and the specific wireless medium may be determined to be available.

Meanwhile, when the received WLAN signal is an RTS frame and a CTS frame is received after the reception of the RTS frame, (A) if a PHY header of the CTS frame indicates that the CTS frame is for the STA, or (B) if the PHY header of the CTS frame indicates that the CTS frame is not for the STA but the CTS frame has a received signal strength equal to or greater than the first CCA level, a predetermined primitive may be issued and a set NAV may be maintained.

If the PHY header of the CTS frame indicates that the CTS frame is not for the STA and the CTS frame has a received signal strength less than the first CCA level, the NAV may be reset and the specific wireless medium may be determined to be available.

On the other hand, if the received WLAN signal is an RTS frame and the RTS frame is not from a BSS of the STA, it may be determined whether a received signal strength of the RTS frame is less than the first CCA level, and if the received signal strength of the RTS frame is less than the first CCA level, the specific wireless medium may be determined to be available.

Further, if the received WLAN signal is an RTS frame or CTS frame for a HEW STA, it may be determined whether the specific wireless medium is available by comparing a received signal strength of the RTS frame or CTS frame for a HEW STA with the first CCA level.

In another aspect of the present invention, an STA in a WLAN system includes a transceiver configured to receive a WLAN signal through a specific wireless medium, and a processor connected to the transceiver and configured to compare a received signal strength of the WLAN signal with a CCA level selected between a first CCA level and a second CCA level according to a type of the WLAN signal, the second CCA level being lower than the first CCA level, and if the received signal strength of the WLAN signal is less than the selected CCA level, determine the specific wireless medium to be available.

Advantageous Effects

According to the present invention, a spatial reuse rate can be increased efficiently in a new Wireless Local Area Network (WLAN) system.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
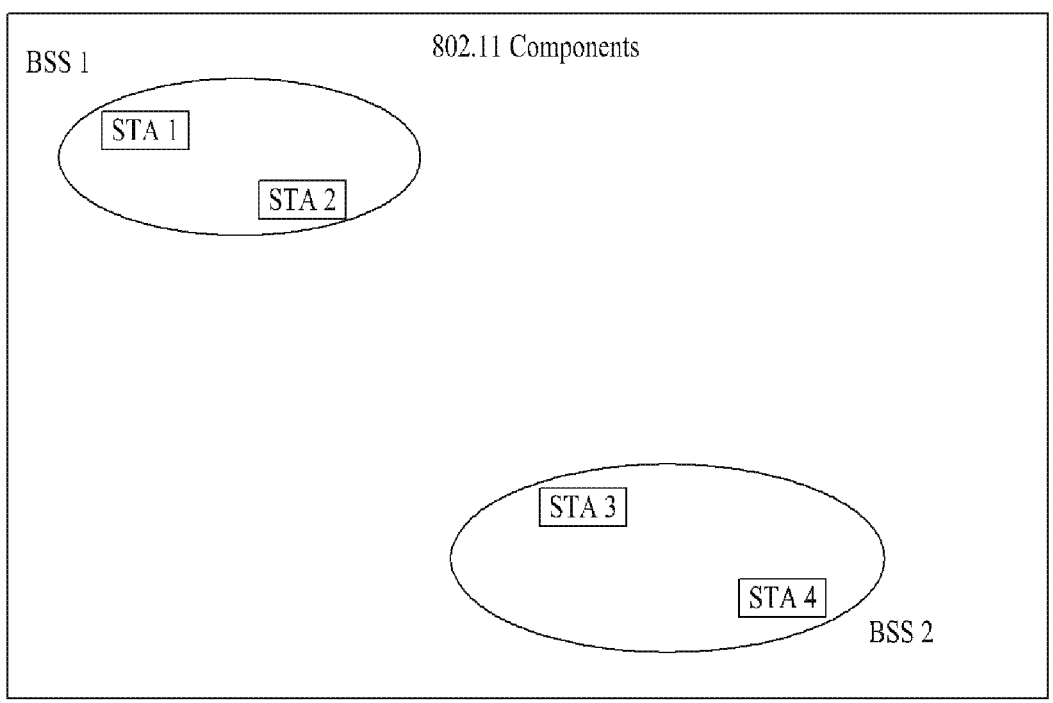
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
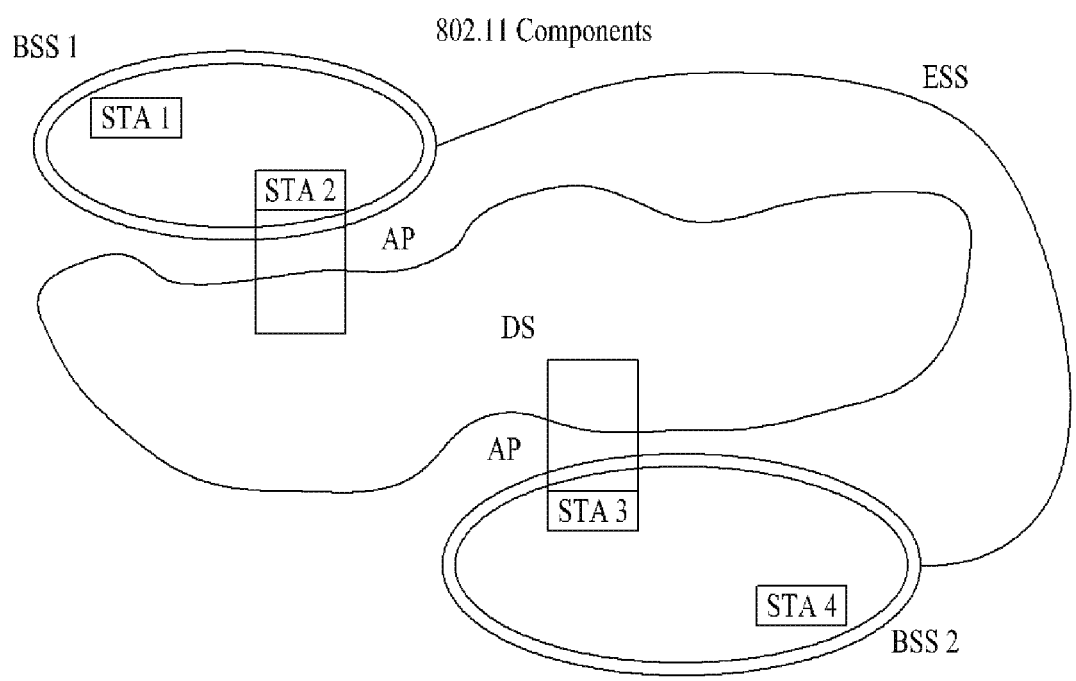
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above description, a collision detection technology of the WLAN system according to the present invention is explained hereinafter.

As mentioned in the foregoing description, a transmitting end has a difficulty in performing accurate collision detection in a wireless environment since various elements affect a channel in the wireless environment. In order to solve the problem, a DCF (distributed coordination function), which corresponds to a CSMA/CA (carrier sense multiple access/collision avoidance) mechanism, has been introduced in 802.11.

Figure 3:
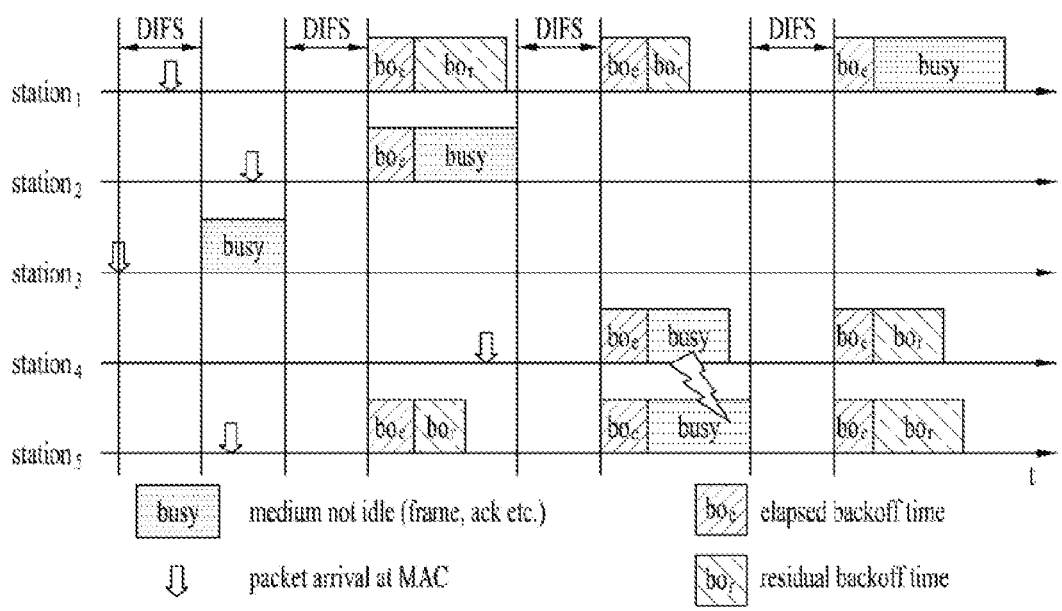
FIG. 3 is a diagram for describing a Distributed Coordination Function (DCF) mechanism in a WLAN system.

FIG. 3 is a diagram for describing the DCF mechanism in the WLAN system.

The DCF performs CCA (clear channel assessment) for sensing a medium during a specific period (e.g., DCF inter-frame space (DIFS)) before STAs having data to be transmitted transmit the data. In this case, if the medium is idle, an STA may transmit a signal using the idle medium. On the contrary, if the medium is busy, an STA may transfer data after waiting for a random backoff period in addition to the DIFS on the assumption that several STAs stand by in order to use the busy medium. In this case, the random backoff period allows STAs to avoid collisions with each other. In particular, assuming that there are a plurality of STAs that intend to transmit data, each of the STAs may have a different backoff period value stochastically. Accordingly, each of the STAs may have a different transmission time. If an STA initiates transmission using a medium, other STAs may not use the medium.

In the following description, a random backoff time and a random backoff procedure are briefly explained.

If a specific wireless medium is switched from a busy state to an idle state, a plurality of STAs start preparations for transferring data. In this case, in order to minimize collisions, each of the STAs that intend to transmit data selects a random backoff count and then stands by for a corresponding slot time. The random backoff count is a pseudo-random integer value and is determined as one of values uniformly distributed in the range of [0 CW]. The CW means a contention window.

Although a CW parameter has an initial value CWmin, this value may be doubled in case of transmission failure. For instance, when an STA fails in receiving ACK in response to a transmitted data frame, the STA may consider that a collision occurs. When a CW value reaches a maximum value CWmax, the CWmax value is maintained until data transmission is successfully performed. If the data transmission is successful, the CW value is reset to the CWmin value. In this case, for convenience of implementation and operation, it is preferable that CW, CWmin and CWmax are set to maintain $2^n-1$.

Meanwhile, if a random backoff procedure is initiated, an STA continuously monitors a medium during backoff slot countdown after selecting a random backoff count in the range of [0 CW]. During the countdown, if the medium enters a busy state, the STA stops the countdown and stands by. Thereafter, if the medium enters an idle state, the STA resumes the rest of backoff slot countdown.

Referring to FIG. 3, when there are a plurality of STAs that intend to transfer data, STA 3 transfers data immediately since a medium has been in the idle state for DIFS. However, the rest of STAs stand by until the medium enters the idle state. Since the medium has been in the busy state for a while, several STAs monitors the medium in order to use it and thus each of the STAs selects a random backoff count. FIG. 3 illustrates a case that STA 2, which selects a smallest backoff count, transmits a data frame.

After the STA 2 completes transmission, the medium is in the idle state again and then the STAs resume the stopped countdown with respect to backoff interval. In FIG. 3, having stopped the countdown for a while since the medium was in the busy state, STA 5 having a second smallest backoff count value (smaller than that of the STA 2) starts data frame transmission after performing the remaining backoff slot countdown. However, a collision occurs since it overlaps with a random backoff count value of STA 4 by chance. In this case, since both of the two STAs fail in receiving ACK response, they select random backoff count values again after doubling the CW.

As described above, the most basic of CSMA/CA is the carrier sensing. A terminal may use both physical carrier sensing and virtual carrier sensing in order to determine whether a DCF medium is in a busy state or an idle state. The physical carrier sensing is performed through energy detection or preamble detection in a physical layer (PHY). For instance, if a voltage level in a receiving end is measured or if it is determined that a preamble is read, the terminal may determine that the medium is in the busy state. The purpose of the virtual carrier sensing is to prohibit other STAs from transmitting data by configuring NAV (network allocation vector) and it is performed using a value of Duration field in a MAC header. Moreover, a robust collision detect mechanism has been introduced in order to reduce collision probability. The reason for the introduction can be checked through the following two examples. For convenience, the range of carrier sensing is assumed to be equal to that of transmission.

Figure 4:
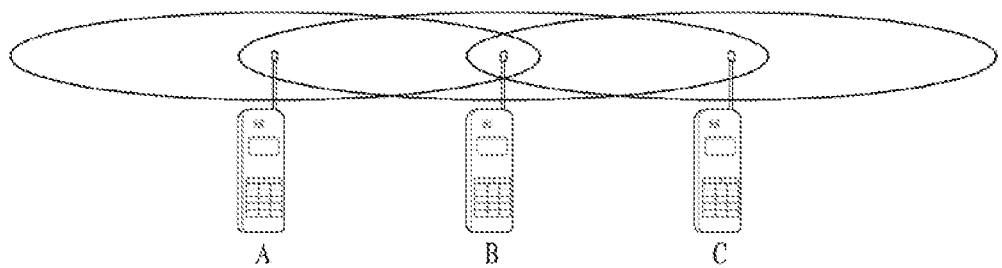
FIGS. 4 and 5 are diagrams for describing problems of the conventional collision resolution mechanism.
Figure 5:
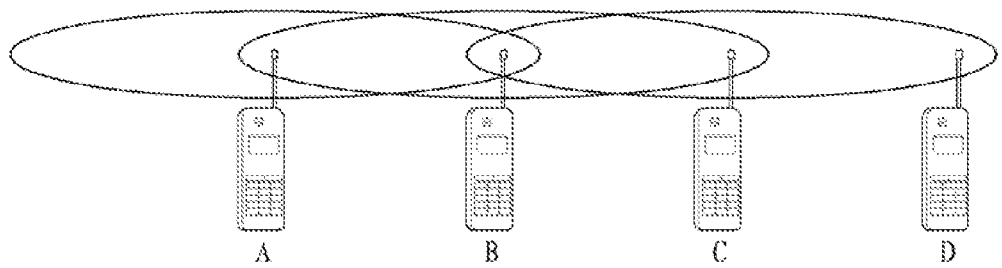

FIGS. 4 and 5 are diagrams for describing problems of the conventional collision resolution mechanism.

Specifically, FIG. 4 is a diagram for explaining hidden node issues. In the present example, STA A and STA B communicate with each other and STA C has information to be transmitted. In particular, although the STA A transmits information to the STA B, while performing the carrier sensing on a medium before transmitting data to the STA B, the STA C cannot detect signal transmission from the STA A since the STA C is out of transmission range of the STA A. As a result, the STA C may determine that the medium is in the idle state. In this case, the STA B simultaneously receives information form both of the STA A and STA C and thus a collision occurs. Here, the STA A can be regarded as a hidden node of the STA C.

On the other hand, FIG. 5 is a diagram for explaining exposed node issues. In FIG. 5, STA B transmits data to STA A. In this case, STA C performs the carrier sensing and then determine that a medium is in the busy state due to information transmitted from the STA B. As a result, even if the STA C intends to transmit data to STA D, since the medium is sensed as busy, the STA C needs to stand by unnecessarily until the medium becomes idle. In other words, even though the STA A is out of the CS range of the STA C, the STA A may prevent the STA C from transmitting information. Here, the STA C can be regarded as an exposed node of the STA B.

To efficiently use a collision avoidance mechanism in the above-mentioned situations, a short signaling packet such as RTS (request to send), CTS (clear to send) or the like can be introduced. According to the short signaling packet, neighboring STAs may overhear whether information is transmitted between two STAs. In other words, if an STA that intends to transmit data transmits an RTS frame to an STA that will receive the data, the receiving STA can notify neighboring STAs that it will receive the data in a manner of transmitting a CRS frame to the neighboring STAs.

Figure 6:
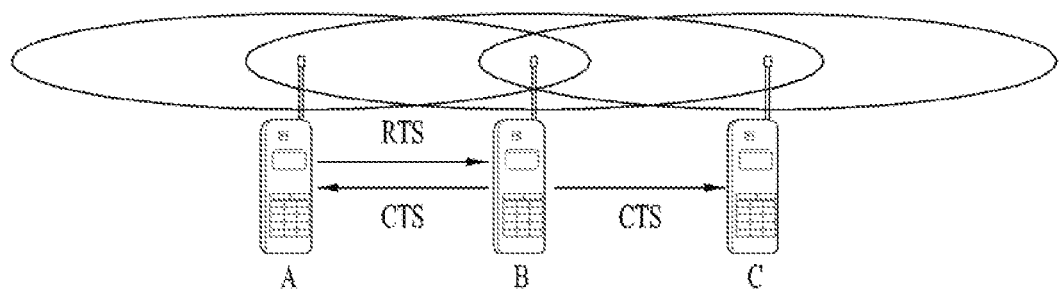
FIG. 6 is a diagram to describe a mechanism for solving hidden node issues using a Request To Send/Clear To Send (RTS/CTS) frame.

FIG. 6 is a diagram to describe a mechanism for solving hidden node issues using RTS/CTS frame.

Referring to FIG. 6, both STA A and STA C intend to transmit data to STA B. If the STA A transmits RTS to the STA B, the STA B transmits CTS to both of the STA A and STA C located adjacent to the STA B. Consequently, the STA C stands by until both of the STA A and STA B complete data transmission and thus a collision can be avoided.

Figure 7:
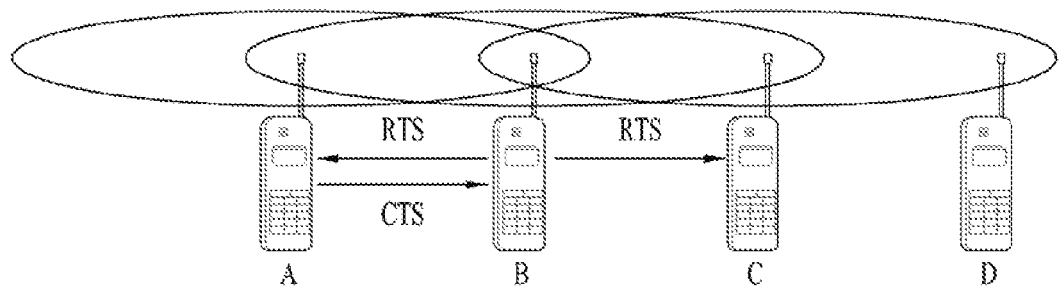
FIG. 7 is a diagram to describe a mechanism for solving exposed node issues using an RTS/CTS frame.

FIG. 7 is a diagram to describe a mechanism for solving exposed node issues using RTS/CTS frame.

Referring to FIG. 7, by overhearing RTS/CTS transmission between STA A and STA B, STA C may know that a collision does not occur even if the STA C transmits data to STA D. In particular, the STA B transmits RTS to all neighboring STAs but transmits CTS only to the STA A to which the STA B will actually transmit data. Since the STA C receives RTS except CTS from the STA A, the STA C can recognize that the STA A is out of the CS range of the STA C.

Figure 8:
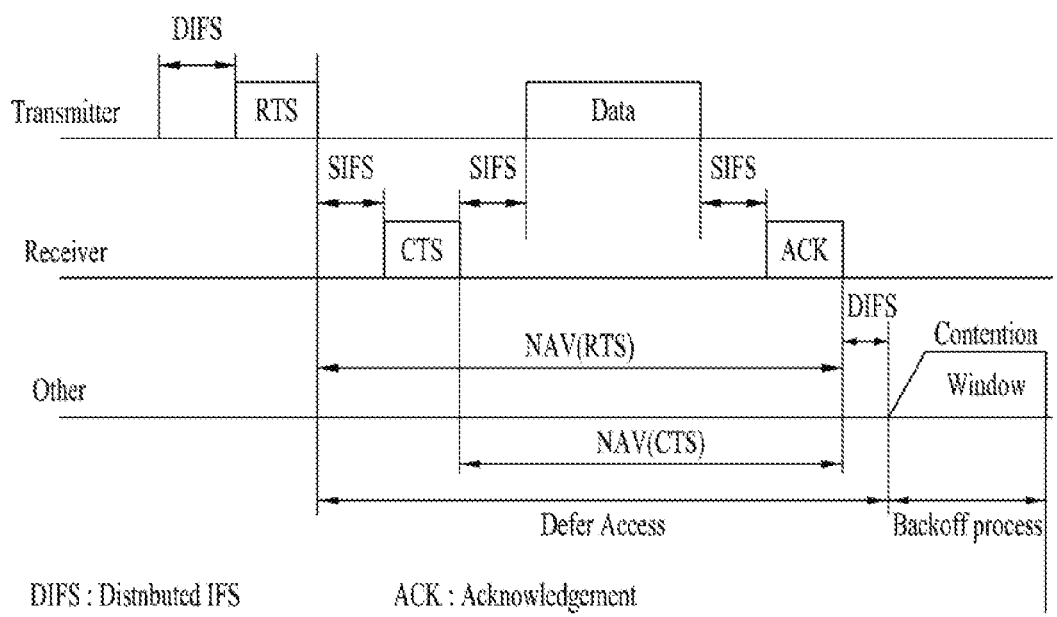
FIG. 8 is a diagram for describing details of an operating method using an RTS/CTS frame.

FIG. 8 is a diagram for describing details of an operating method using RTS/CTS frame.

Referring to FIG. 8, after DIFS (distributed IFS), a transmitting STA may transmit an RTS frame to a receiving STA to which the transmitting STA will transmit a signal. Having received the RTS frame, the receiving STA may transmit CTS to the transmitting STA after SIFS (short IFS). After receiving CTS from the receiving STA, the transmitting STA may transmit data after SIFS as shown in FIG. 8. After receiving the data, the receiving STA may transmit ACK response in response to the data received after SIFS.

Meanwhile, among neighboring STAs except the above-mentioned transmitting and receiving STAs, an STA that receives RTS/CTS of the transmitting STA may determine whether a medium is busy or not according to RTS/CTS reception as described above with reference to FIGS. 6 and 7. And, the STA may configure NAV (network allocation vector) based on the medium state. If NAV duration ends, the STA may perform the contention resolution procedure described above with reference to FIG. 3 after DIFS.

As described above, an 802.11 STA determines whether to transmit a signal on a channel by checking the state (clear or occupied) of the channel according to a CCA rule. In 802.11c, for example, an STA uses the CCA levels of a primary channel and a secondary channel. If the strength of a signal received on a channel is equal to or less than the CCA level of the channel, the STA transmits a signal on the channel, determining that the channel is clear.

An 802.11a/g system has the following CCA requirements.

The start of a valid OFDM transmission with a received signal strength at a receiver, which is equal to or greater than a minimum modulation and coding rate sensitivity (−82 dBm for a 20-MHz channel spacing, −85 dBm for a 10-MHz channel spacing, and −88 dBm for a 5-MHz channel spacing) causes CS/CCA to indicate busy with a probability greater than 90% within 4 μs for the 20-MHz channel spacing, 8 μs for the 10-MHz channel spacing, and 16 μs for the 5-MHz channel spacing.

If the preamble part of the signal is missed, the receiver may determine the medium to be busy through any CCA signal 20 dB above the minimum modulation and coding rate sensitivity (−62 dBm for the 20-MHz channel spacing, −65 dBm for the 10-MHz channel spacing, and −68 dBm for the 5-MHz channel spacing).

Meanwhile, a PHY operation is performed as follows, for the CCA rule.

If a transmitted physical preamble is received, the PHY layer may measure the strength of the received signal. This operation may be known to the MAC layer through a PHY-CCA.indication primitive. As the signal is received before reception of an accurate Physical layer Protocol Data Unit (PPDU), a PHY-CCA.indication (BUSY) primitive may be issued. Received signal strength information (e.g., a Received Signal Strength Indicator (RSSI) parameter) may be reported to the MAC layer through RXVECTOR.

After the PHY-CCA.indication primitive is issued, the PHY entity may receive training symbols and search for SIGNAL.

If a PHY header has been received successfully, a PHY-RXSTART.indication primitive may be issued.

Meanwhile, a CCA sensitivity for an operating class requiring CCA-Energy Detect (CCA-ED) is defined as follows in the 802.11ac system.

Upon receipt of a signal above a CCA-ED level which is given as dot11OFDMEDThreshold for a primary 20-MHz channel and a secondary 20-MHz channel, dot11OFDMEDThreshold+3 dB for a secondary 40-MHz channel, and dot11OFDMEDThreshold+6 dB for a secondary 80-MHz channel, CCA-ED may represent the channel as busy.

CCA-ED thresholds for operating classes requiring CCA-ED may be based on predetermined reference values of the standards.

[Table 1] below lists CCA sensitivities of a signal occupying the primary 20-MHz channel.

TABLE 1

| Operating class width | Conditions |
| --- | --- |
| 20 MHz, 40 MHz, 80 MHz, 160 MHz, or 80 + 80 MHz | The start of 20-MHz NON_HT PPDU (as defined in 18.3.10.6 of the 802.11ac standard). The start of HT PPDU (under the conditions defined in 20.3.21.5 of the 802.11ac standard). The start of 20-MHz VHT PPDU in the primary 20-MHz channel at or above −82 dBm |
| 40 MHz, 80 MHz, 160 MHz, or 80 + 80 MHz | The start of 40-MHz non-HT duplicate or VHT PPDU in the primary 40-MHz channel at or above −79 dBm. The start of HT PPDU (under the conditions defined in 20.3.21.5 of the 802.11ac standard). |
| 80 MHz, 160 MHz, or 80 + 80 MHz | The start of 80-MHz non-HT duplicate or VHT PPDU in the primary 80-MHz channel at or above −76 dBm |
| 160 MHz or 80 + 80 MHz | The start of 160-MHz or 80 + 80-MHz non-HT duplicate or VHT PPDU at or above −73 dBm |

Meanwhile, the 802.11ah system has the following CCA criteria.

TABLE 2

| Operating Channel Width | Conditions |
| --- | --- |
| 2 MHz, 4 MHz, 8 MHz, 16 MHz | The start of a 2 MHz S1G PPDU in the primary 2 MHz channel at or above −92 dBm. |
| 4 MHz, 8 MHz, 16 MHz | The start of a 4 MHz S1G PPDU in the primary 4 MHz channel at or above −89 dBm. |
| 8 MHz, 16 MHz | The start of an 8 MHz S1G PPDU in the primary 8 MHz channel at or above −86 dBm. |
| 16 MHz | The start of a 16 MHz S1G PPDU at or above −83 dBm. |

TABLE 3

| Operating Channel Width | Conditions |
| --- | --- |
| 2 MHz, 4 MHz, 8 MHz, 16 MHz | The start of a 2 MHz S1G PPDU in the primary 2 MHz channel at or above −89 dBm. |
| 4 MHz, 8 MHz, 16 MHz | The start of a 4 MHz S1G PPDU in the primary 4 MHz channel at or above −86 dBm. |
| 8 MHz, 16 MHz | The start of an 8 MHz S1G PPDU in the primary 8 MHz channel at or above −83 dBm. |
| 16 MHz | The start of a 16 MHz S1G PPDU at or above −80 dBm. |

Now, a description will be given of a trade-off between sensitivity and spatial reuse of a receiver.

If the sensitivity of the receiver increases, the receiver cannot be active in channel access. Therefore, the inactivity of the STA may decrease a spatial reuse rate. Accordingly, it is proposed in the IEEE 802.11ah system that if an STA within the same BSS as that of a specific STA is using a corresponding channel, the specific STA cannot use the channel, whereas if an STA within a different BSS from that of the specific BSS is using the channel, the specific STA may use the channel. The specific STA may determine whether a signal is from the same BSS by checking whether a PBSSID matches the PBSSID of the specific STA on UL and by checking whether the BSS matches the BSS of the specific STA through COLOR on DL.

A method for increasing spatial efficiency in a new WLAN system (e.g., an IEEE 802.11ax system) will be described below based on the above description.

Basically, a spatial reuse rate may be increased by the use of a CCA level higher than in a legacy system, for an 11ax frame, even in 11ax (High Efficiency WLAN (HEW)). Therefore, unless otherwise mentioned, it is assumed that a CCA level (a first CCA level) for HEW is higher than a CCA level used in the legacy system. However, since legacy STAs should be supported in HEW, a second CCA level also needs to be used for PPDU transmissions of the legacy STAs. Accordingly, an embodiment of the present invention proposes that two or more CCA levels are used selectively according to the type of a WLAN signal. For example, if a transmitted frame is a HEW frame, the first CCA level may be selectively used. If the transmitted frame is a legacy frame, the second CCA level may be selectively used.

Based on the above description, a description will be given of a method for receiving a legacy frame or an 11ax frame based on two CCA levels (first and second CCA levels).

Figure 9:
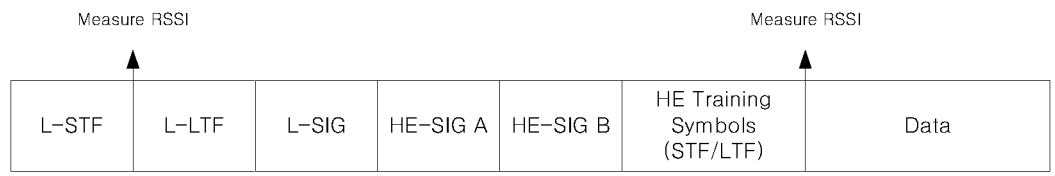
FIG. 9 illustrates an exemplary High Efficiency (HE) Physical layer Protocol Data Unit (PPDU) format.

FIG. 9 illustrates an exemplary HE PPDU format.

In FIG. 9, HE Training Symbols may be HE-STF/HE-LTF. As is the case with the HE PPDU format illustrated in FIG. 9, when an STA receives L-STF, the STA measures an RSSI and determines whether a channel is busy or idle based on a legacy CCA level (e.g., −82 dBm in 20 MHz). If the channel is busy, the STA indicates to the MAC that the channel is busy by PHY-CCA.indication and receives training symbols (i.e., L-LTF) and L-SIG. If the STA receives L-SIG successfully (parity bits are valid), the STA determines whether the PPDU is a HE PPDU according to a PPDU auto detection rule as defined in the standard. If the PPDU is a legacy PPDU, the STA holds CCA as busy and then decodes the remaining frame.

If the PPDU is a HE PPDU, the STA determines whether the channel is busy or idle based on a HE CCA level. For example, if the RSSI of the received signal is higher than both the legacy CCA level and the HE CCA level, the STA holds CCA as busy and decodes the remaining frame. If the RSSI is higher than the legacy CCA level and lower than the HE CCA level, the STA changes CCA to idle. The RSSI may be a value which has been measured previously in L-STF and then stored, or a newly measured value. If the RSSI is lower than the HE CCA level, the STA may set idle in a CCA indication and transmits the CCA indication to the MAC, or include the measured RSSI in RXSTART.Indication and transmit RXSTART.Indication to the MAC. A method for setting CCA as busy or idle based on BSS Color information (BSS ID information by which it may be determined whether a BSS is identical to the BSS of the STA) included in HE-SIG A may be used. If the STA determines that the BSS matches the BSS of the STA by checking the BSS Color/BSS ID set in HE-SIG A, the STA sets CCA as busy even though the RSSI is lower than the HE CCA level. That is, in the case of a different BSS, if the measured RSSI is lower than the HE CCA level, the STA holds CCA as idle and if the measured RSSI is higher than the HE CCA level, the STA holds CCA as busy, as described above. The STA operates as described above, according to whether CCA is busy or idle.

It has been described above that in the case where the STA determines that the received PPDU is a legacy PPDU, the STA uses the legacy CCA level and if the RSSI is higher than the legacy CCA level, the STA sets or holds CCA as busy. However, in spite of a legacy PPDU, the STA may use the HE CCA level depending on whether the BSS of the legacy PPDU matches the BSS of the STA, to thereby increase a spatial reuse rate. For example, if the PPDU is a legacy PPDU and the legacy PPDU is a packet from the BSS of the STA, the STA sets or holds CCA as busy by continuously applying the legacy CCA level. If the legacy PPDU is a packet from a different BSS (i.e., an OBSS), the STA determines whether CCA is idle or busy by applying the HE CCA level. If the STA determines that CCA is idle, the STA may perform spatial/channel reuse during a transmission period of the corresponding frame or a Transmission Opportunity (TXOP) duration indicated by the frame. This method is applicable to derived methods mentioned in the present invention.

If at least one of the Receiver Address (RA, Address 1) and Sender Address (SA, Address 2) of a MAC Protocol Data Unit (MPDU) (e.g., a MAC header) in a legacy frame matches the BSSID of an AP/BSS to which the STA belongs, the STA determines that the BSS of the legacy frame is its BSS. In the case of an 11ac UL PPDU, if the partial AID of HE-SIG A matches the BSSID (e.g., 9 Least Significant Bits (LSBs)) of the AP/BSS to which the STA belongs, the STA determines that an STA/AP within its BSS has transmitted the packet. For a legacy PPDU, spatial reuse may be performed in one of the two methods as defined above.

Meanwhile, when an 11ax PPDU is transmitted, the PPDU may be protected using an RTS/CTS frame as described above. However, since the RTS/CTS frame is a legacy frame, the spatial reuse rate may be lower in the above-described embodiment than in the case of RTS/CTS-free transmission.

For example, if a corresponding PPDU is from an OBSS and a measured signal level of the PPDU is between an 11ax CCA level and a legacy CCA level, the corresponding medium may be set as busy by a Network Allocation Vector (NAV) in the presence of an RTS/CTS frame, whereas the medium may be determined to be idle in the absence of an RTS/CTS frame, thus enabling spatial reuse, because the measured signal level does not satisfy the 11ax CCA level.

To avert the above-described problem, an embodiment of the present invention proposes the following method in the case where a PPDU transmitted during a TXOP interval configured by an RTS/CTS frame is an 11ax PPDU.

Figure 10:
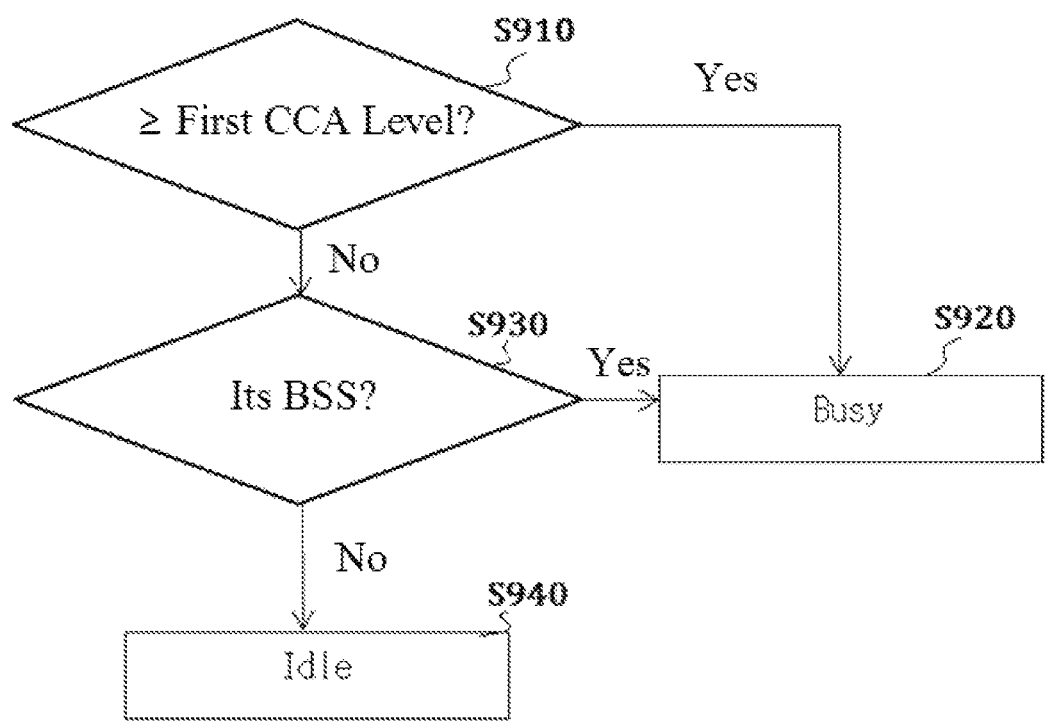
FIG. 10 is a flowchart illustrating a method for determining whether a corresponding channel is available according to an embodiment of the present invention.

FIG. 10 is a flowchart illustrating a method for determining whether a corresponding channel is available according to an embodiment of the present invention.

If an 11ax PPDU is transmitted during a TXOP interval indicated by an RTS/CTS frame, a channel may be determined to be idle or busy by applying an 11ax CCA level (a first CCA level) irrespective of a NAV set by the RTS/CTS frame in the embodiment.

Specifically, as illustrated in FIG. 9, an STA may first determine whether the received signal strength of a corresponding PPDU is equal to or greater than the 11ax CCA level (S910). If the received signal strength of the PPDU is equal to or greater than the 11ax CCA level, the STA may determine a corresponding medium to be busy (S920).

If the received signal strength of the PPDU is less than the 11ax CCA level, the STA may further determine whether the PPDU is from a BSS to which the STA belongs in the embodiment (S930). The STA may determine whether the PPDU is for the STA in the above-described method. If the STA determines that the PPDU is from its BSS, the STA may determine the medium to be busy (S920).

If the received signal strength of the PPDU is less than the 11ax CCA level and the PPDU is not from the BSS of the STA, the STA may determine the medium to be idle without the need for comparing the received signal strength of the PPDU with a legacy CCA level (S940). If the medium is determined to be idle, the spatial reuse rate may be increased efficiently, compared to the conventional technology.

Figure 11:
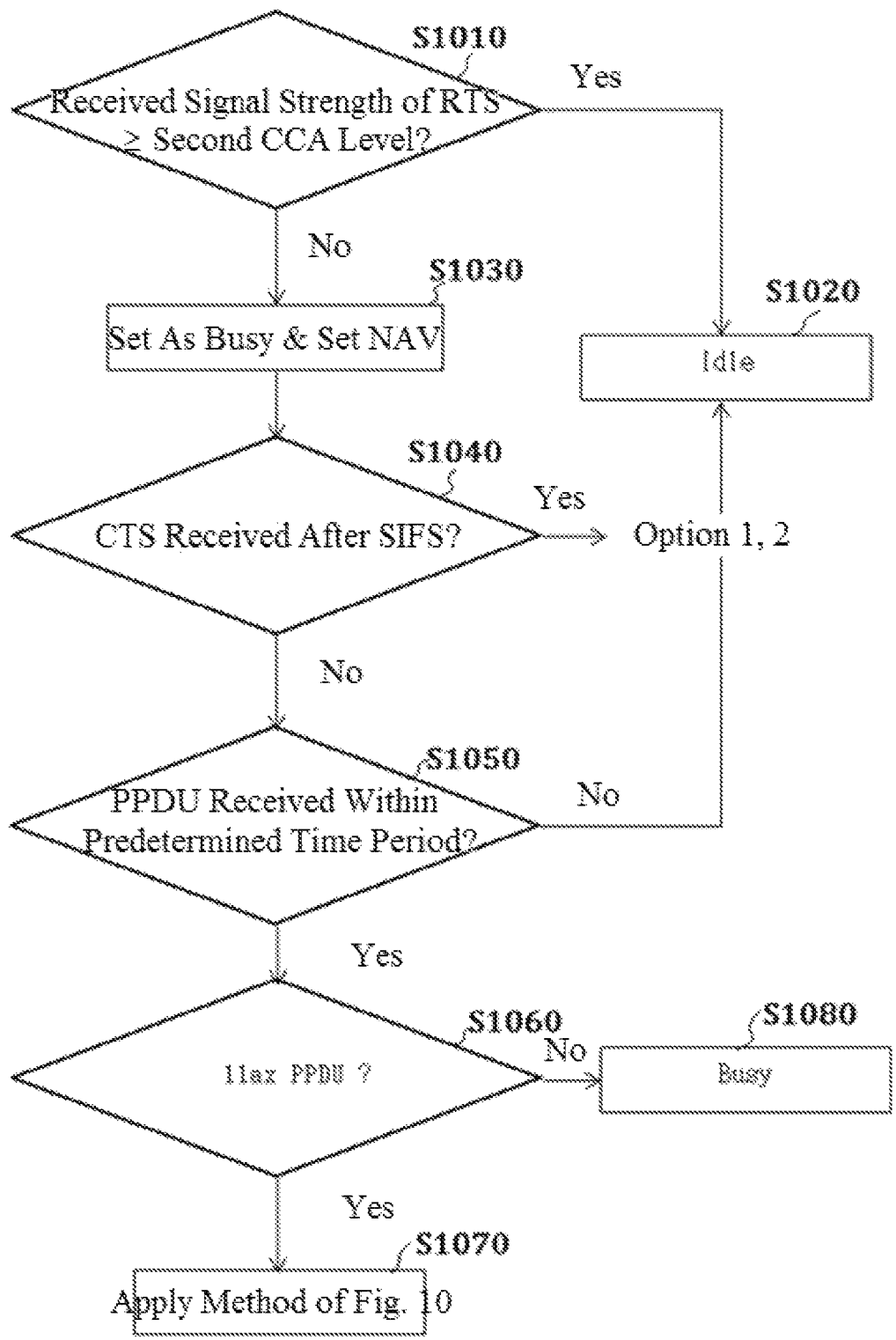
FIG. 11 is a flowchart illustrating an operation performed in response to reception of an RTS/CTS frame according to a preferred embodiment of the present invention.

FIG. 11 is a flowchart illustrating an operation performed in response to reception of an RTS/CTS frame according to a preferred embodiment of the present invention.

As described before, if a HEW(11ax) STA receives a HEW PPDU (i.e., an 11ax PPDU), the HEW(11ax) STA may determine whether the medium is available by applying an 11ax CCA level (e.g., a high CCA level), and if the HEW (11ax) STA receives a legacy PPDU (i.e., a non-11ax PPDU), the HEW(11ax) STA may determine whether the medium is available by applying a legacy CCA level (i.e., a low CCA level). Herein, it is assumed that the 11ax CCA level is set to a value higher than the legacy CCA level. For the convenience, it will be described that a medium is determined to be idle or busy on the assumption that the legacy CCA level is −82 dBM and the 11ax CCA level is −72 dBM, for 20 MHz in the embodiment of the present invention.

In the embodiment, it is also assumed that an RTS/CTS frame is transmitted in the form of a NON HT PPDU (L-STF+L-LTF+L-SIG+PSDU) and processed as a legacy PPDU, as is done conventionally.

Accordingly, if an 11ax STA receives an RTS frame, the 11ax STA may determine whether the received signal strength of the RTS frame satisfies the legacy CCA level (a second CCA level) (e.g., >=−82 dBm) because the RTS frame is in the form of a NON HT PPDU in the embodiment (S1010). If the received signal strength of the RTS frame is less than the legacy CCA level, the 11ax STA may determine the medium to be idle (S1020). In this case, spatial reuse may be possible through the medium.

If the received signal strength of the RTS frame is equal to or greater than the legacy CCA level (−82 dBm), the STA may determine the channel to be busy and update a NAV based on information about the duration of an RTS PSDU (S1030).

A case in which a CTS frame is received a Short Inter-Frame Space (SIFS) after the RTS reception (S1040) will be described later. A case in which a CTS frame is not received an SIFS after the RTS reception (S1040) will first be described.

If the STA fails to receive a CTS frame, the STA may determine whether a PPDU corresponding to an RTS frame has been received within a predetermined time period (S1050). The predetermined time period may be, but not limited to, [(2×aSIFSTime)+(CTS_Time)+aPHY-RX-START-Delay+(2×aSlotTime)]. Specifically, if a PHY-RX-START.indication primitive is not detected within the predetermined time period, that is, a PPDU corresponding to an RTS frame is not received (S1050), the NAV set as described before may be reset and the medium may be set as idle again (S1020). In this case, the spatial reuse rate may be increased, relative to the conventional technology.

On the other hand, if the STA succeeds in detecting a preamble and receiving a PHY header within the predetermined time period without CTS reception, the STA may determine whether the PPDU is an 11ax PPDU or a legacy PPDU (S1060). If the PPDU is a legacy PPDU, the STA may determine the channel to be busy (S1080). Or as described before with reference to FIG. 10, if the PPDU is an 11ax PPDU from a BSS of the STA, the STA preferably sets the channel as busy.

The STA may determine whether the PPDU is from its BSS by checking whether a partial AID matches a PBSSID of the STA on UL and whether a value set in the COLOR field of the PHY header (e.g., a preamble/SIG field) matches the COLOR value of the BSS of the STA on DL.

If the PPDU is an 11ax PPDU from a BSS other than the BSS of the STA and the RSSI of the PPDU is equal to or greater than the 11ax CCA level (e.g., −72 dBm), the STA may also set/hold the channel as busy.

If the PPDU is an 11ax PPDU from a BSS other than the BSS of the STA and the RSSI of the PPDU is less than the 11ax CCA level (−72 dBm), the STA may set the channel as idle. In this case, the STA may reset the NAV set by the RTS frame and use the reset NAV for spatial reuse.

The above-defined method applied to a legacy frame may also be applied to an RTS/CTS-based operation. That is, even though an RTS/CTS frame is transmitted as a legacy frame, if the RTS/CTS frame is determined to be a frame transmitted from a different BSS, it is determined whether the channel is idle or busy, using a HE CCA level. For example, if a measured RSSI is less than the HE/11ax CCA level and the RTS/CTS frame is transmitted by a different BSS, the channel may be reused during a corresponding frame interval or a TXOP interval indicated by the frame.

Meanwhile, upon receipt of a CTS frame (>=−82 dBm) an SIFS after reception of an RTS frame having an RA different from the address of the STA, the STA may use one of the following options as illustrated in FIG. 11.

Option 1: a NAV is updated based on information of the CTS frame.

Option 2: if the RSSI of the CTS frame is equal to or greater than the 11ax CCA level, a NAV set by the RTS and CTS frames may be maintained. If the RSSI of the CTS frame is less than the 11ax CCA level, it may be determined whether an 11ax PPDU has been received within the predetermined time period. If a legacy PPDU is received or an 11ax PPDU is received from the BSS of the STA, the STA may set the channel as busy, maintaining the NAV. Also, if the PPDU is not an 11ax PPDU transmitted by the BSS of the STA but has an RSSI greater than the 11ax CCA level, the STA may set the channel as busy. Further, if the PPDU is from a BSS other than the BSS of the STA and has an RSSI less than the 11ax CCA level, the STA may set the channel as idle and reset the NAV, thus enabling spatial reuse.

[Table 4] below summarizes the above-described method for determining whether a medium is available.

In an embodiment, in the case where only an RTS frame of a different BSS is received, if the RSSI of the RTS frame is less than an 11ax CCA level, a NAV may be reset irrespective of whether a PPDU has been received within a predetermined time, and spatial reuse may be performed.

Additionally, only if a PPDU is received within the predetermined time period and the PPDU is an flax PPDU, the NAV may be reset and the channel may be used for spatial reuse.

In another example of the present invention, if an RTS sequence and a CTS sequence are received from a different BSS and the RSSIs of the two frames are less than the 11ax CCA level, the NAV may be reset and used for spatial reuse, as a first option. Additionally, it may be restricted that only if the PPDU received within the predetermined time period is an 11ax PPDU, the NAV is reset. As a second option, if a CTS frame is received, the NAV may be set based on the RTS/CTS frame.

In another example of the present invention, if an RTS frame is received from the BSS of the STA, the STA may perform a legacy operation.

As described before, in the case where not an 11ax frame but a legacy frame is received, if the legacy frame is from

TABLE 4

| RTS (X) | CTS (Y) | Data PPDU (Z) | Notes |
| --- | --- | --- | --- |
| X >= −82 dBm | Y < −72 dBm (Either Y < −82 or −82 =< Y < −72) | Not received (Z < −82 dBm) | Idle & PHY-RXSART.Indication is not issued (i.e., NAV reset) |
| | | Legacy PPDU (Z >= −82 dBm) 11ax PPDU (Z >= −72 dBm) | Busy & If the PHY(#61) header reception is successful, PHY-RXSTART.indication is issued |
| | | 11ax PPDU (−82 =< Z < −72(dBm)) | If PPDU is of my BSS, Busy & PHY-RXSTART.indication is issued Otherwise, Idle & PHY-RXSTART.Indication is not issued (i.e., NAV updated by RTS or CTS is reset) |
| | Y >= −72 dBm | Data PPDU reception not needed | Always, NAV set by RTS/CTS is maintained |

In the above-descried embodiment, if a PPDU is received within a predetermined time period after RTS reception, PHY-RXSTART.indication may be issued as follows in response to successful reception of a PHY header.

Case 1: if any of the following conditions is satisfied, a PHY-RXSTART.indication(RXVECTOR) primitive may be generated.

Condition 1: a PHY header of a BSS to which the STA belongs is received successfully.

Condition 2: a PHY header of a BSS to which the STA does not belong is received, and the PHY header reception satisfies or exceeds a minimum 11ax CCA sensitivity.

That is, if a PHY header belonging to a different BS is received and the reception does not satisfy the 11ax CCA sensitivity, the PHY-RXSTART.indication primitive may not be issued, and in this case, the NAV set by the RTS frame may be reset.

If CTS reception does not exceed the minimum 11ax CCA sensitivity level after the RTS reception, Case 1 may also be applied.

Meanwhile, a method for performing spatial reuse in a MAC-based manner according to another aspect of the present invention will be described below.

An STA may determine whether a received RTS frame is a PPDU from a BSS of the STA or a different BSS by the TA/destination address of the RTS frame.

a different BSS, it may be determined whether a channel is idle or busy by applying a HE CCA level to the legacy frame in order to increase a spatial reuse rate in the RTS/CTS procedure-based method. If the legacy frame is from a different BSS and has an RSSI less than the HE CCA level, the STA may set the channel as idle and transmit a frame during a frame transmission period or a TXOP interval set by a frame through spatial reuse.

While the above embodiments have been described in the context of an RTS/CTS frame being a legacy frame, 11ax STAs may transmit an RTS/CTS frame in a new 11ax PPDU format in an embodiment of the present invention.

Since an RTS/CTS frame is configured in the 11ax PPDU format in the embodiment of the present invention, spatial reuse may be performed according to the 11ax CCA level. That is, if a PPDU does not satisfy the 11ax CCA level and is from a BSS other than the BSS of the STA, the STA may perform spatial reuse. Meanwhile, if the PPDU does not satisfy the 11ax CCA level and is from the BSS of the STA, the STA may set the corresponding channel as busy.

In this embodiment, a legacy STA operates as follows.

LENGTH of L-SIG of a new CTS frame may include TXOP duration information. Therefore, legacy STAs receiving the new CTS frame may set a NAV based on the information (e.g., the LENGTH field) of L-SIG in the CTS frame.

Because the length of L-SIG in a new RTS frame includes a length to reception of a new CTS frame, legacy STAs receiving the new RTS frame may discontinue channel access until a symbol indicated by L-SIG.

Information about the BSS of the STA may be included in an 11ax PHY header (e.g., a preamble/a SIG field). That is, COLOR field information or a partial BSSID, which is BSS information, may be included in the PHY header.

Meanwhile, if a PPDU is a VHT UL PPDU, Group ID of SIG-A may be set as 0 and the partial AID may be set as a partial BSSID (9 bits). Upon receipt of the VHT UL PPDU, 11ax STAs may determine whether the VHT UL PPDU has been transmitted by their BSSs based on SIG-A. In this case, the 11ax STAs may determine spatial reuse by applying a 11ax CCA sensitivity level to the VHT UL PPDU.

For example, in the case where the received VHT UL PPDU is equal to or less than the 11ax CCA sensitivity level (if the received VHT UL PPDU exceeds an 11ac CCA level), if the VHT UL PPDU matches the PBSSID of an STA, the STA may set a corresponding channel as busy, and otherwise, the STA may transmit a frame by spatial reuse.

That is, if the group ID of the VHT PPDU is 0, the STA may determine CCA using the 11ax CCA sensitivity level. If the CCA is idle in the 11ax CCA sensitivity level-based determination, the STA may determine busy or idle based on the PBSSID.

Meanwhile, if an 11ax STA detects a legacy preamble (e.g., a DL frame of 11ac and a DL/UL frame of 11a/n), a legacy CCA sensitivity level may be used (e.g., −82 dBm for a primary channel and −72 dBm for a secondary channel).

If an RTS/CTS frame is a legacy frame, a legacy CCA level and a NAV operation may be used.

Meanwhile, the above description may be extended to an operation in the case of the same ESS, as follows.

In the above embodiment, it has been described that if a detected PPDU is from a different BSS and does not satisfy a CCA level, spatial reuse is performed. However, transmission from the different BSS may be adversely affected (interference or error in transmission), and if the same OBSS belongs to the same ESS, network performance may be degraded.

Accordingly, a low CCA level (e.g., a legacy CCA level) may be used for a PPDU transmitted by a BSS belonging to the same ESS, to thereby protect transmission in the same ESS in an embodiment of the present invention.

Specifically, the same COLOR value may be set for BSSs belonging to the same ESS on DL. The COLOR value may be set by a network manager.

In a first option for UL, one Most Significant Bit (MSB) (or one LSB) of a 9-bit partial AID may indicate belonging to an ESS. If an ESS indication bit is 1 (i.e., if belonging to an ESS is indicated), an 11ax STA receiving the PPDU may determine that the BSS of the PPDU belongs to the same ESS and determine whether the medium is busy or idle by applying a low CCA level.

In another option, an AP may provide information about a list of BSSs belonging to the same ESS to an STA by a Beacon/Probe Response/Association Response. The STA may determine whether a BSS of a PPDU belongs to the same ESS by partial BSSID information. In the case of transmission from the same ESS, the STA may determine whether the medium is busy or idle by applying a low CCA level (e.g., the legacy CCA level).

In another embodiment of the present invention, protection or non-protection of transmission from the same ESS may be selected. Corresponding information may be transmitted to the STA by a Beacon/Probe Response/Association Response. If ESS protection is set, the STA may determine whether the channel is idle or busy by applying a low CCA level, and otherwise, the STA may determine whether the channel is idle or busy by applying a high CCA level, for transmission from the ESS.

Figure 12:
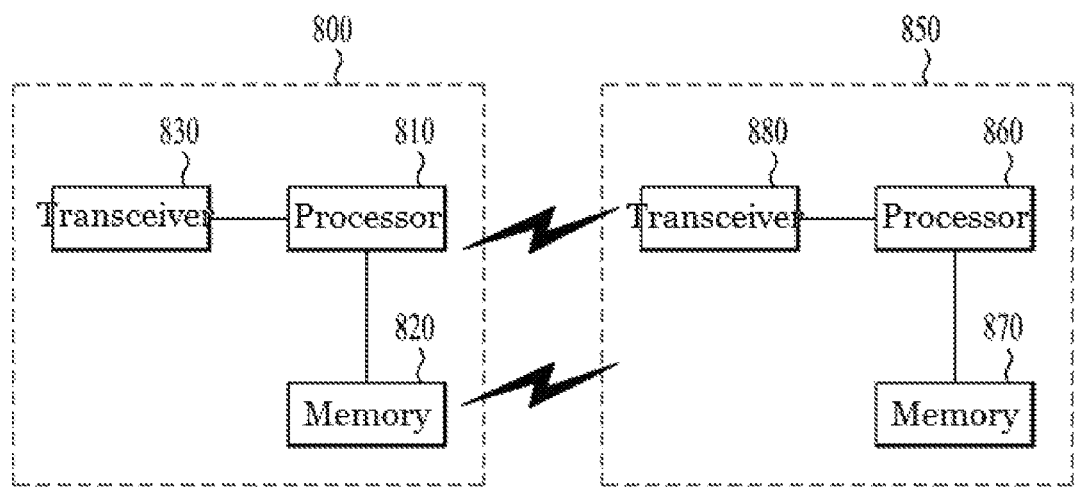
FIG. 12 is a block diagram of WLAN devices for increasing a spatial reuse rate.

FIG. 12 is a block diagram of WLAN devices for increasing the afore-described spatial reuse rate.

A wireless device 800 and a wireless device 850 in FIG. 12 may correspond to the aforementioned STA/AP 1 and STA/AP 2, respectively.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the present invention has been described above in the context of an IEEE 802.11 WLAN system, the present invention is not limited thereto. The present invention is applicable in the same manner to various wireless systems in which a CCA-based operation or its equivalent operation is performed between wireless devices.

What is claimed is:
1. A method for spatial reuse by a station (STA) in a wireless local area network (WLAN) system, the method comprising:
    receiving a signal through a channel;
    detecting a status of the channel as busy when a strength of the received signal exceeds a first Clear Channel Assessment (CCA) level; and
    configuring a Network Allocation Vector (NAV) for spatial reuse, when:
        the STA is adapted for spatial reuse, the received signal is of a physical protocol data unit (PPDU) from a second Basic Service Set (BSS) other than a first BSS, the first BSS being a BSS of the STA, the PPDU is not a first type PPDU, and the strength of the received signal is below a second CCA level, the second CCA level being higher than the first CCA level;

communicating based on the NAV.

2. The method of claim 1, wherein configuring the NAV for spatial reuse comprises:

not updating the NAV based on the received signal.

3. The method of claim 1, wherein configuring the NAV for spatial reuse comprises:

not updating the NAV based on the received signal, even when the status of the channel is detected as busy.

4. The method of claim 1, wherein the first type PPDU is a legacy PPDU in view of a High Efficiency (HE) PPDU.

5. The method of claim 1, wherein the received signal is determined as received from the second BSS, when a BSS color of the received signal is not a BSS color of the first BSS.

6. A station (STA) adapted to operate for spatial reuse in a wireless local area network (WLAN) system, the STA comprising:

a transceiver configured to receive a signal through a channel; and a processor configured to detect a status of the channel based on comparison between a first Clear Channel Assessment (CCA) level and a strength of the signal received by the transceiver, and to set a Network Allocation Vector (NAV), wherein the processor is configured to set the NAV for spatial reuse, in response the processor determines following conditions are met, and wherein the following conditions includes:

the STA is adapted for spatial reuse, the received signal is of a physical protocol data unit (PPDU) from a second Basic Service Set (BSS) other than a first BSS, the first BSS being a BSS of the STA, the PPDU is not a first type PPDU, and the strength of the received signal is below a second CCA level, the second CCA level being higher than the first CCA level.

7. The STA of claim 6, wherein the processor sets the NAV for spatial reuse by not updating the NAV based on the received signal.

8. The STA of claim 7, wherein the processor does not update the NAV based on the received signal, even when the processor detects the status of the channel as busy.

9. The STA of claim 6, wherein the first type PPDU is a legacy PPDU in view of a High Efficiency (HE) PPDU.

10. The STA of claim 6, wherein the processor determines the received signal as received from the second BSS, when a BSS color of the received signal is not a BSS color of the first BSS.

* * * * *